April 25, 1933.                    J. HARTNESS                     1,905,705
                              SCREW THREAD GAUGE
                    Filed Nov. 18, 1927           4 Sheets-Sheet 1

April 25, 1933.  J. HARTNESS  1,905,705
SCREW THREAD GAUGE
Filed Nov. 18, 1927  4 Sheets-Sheet 2

Patented Apr. 25, 1933

1,905,705

UNITED STATES PATENT OFFICE

JAMES HARTNESS, OF SPRINGFIELD, VERMONT

SCREW THREAD GAUGE

Application filed November 18, 1927. Serial No. 234,116.

This application is a continuation-in-part of my copending application Serial No. 192,236, filed May 18, 1927, for thread gauging.

One of the most important phases of standardization of screw thread products is that of interchangeability, so that the products made in different parts of a manufacturing plant or in different manufacturing plants at a distance from each other may be assembled without difficulty and in a dependable manner.

In order that such interchangeability may be secured it is necessary that several elements be taken into account, none of which may be varied beyond predetermined limits for a certain class of fit. Important among these elements are major diameter, pitch diameter, minor diameter, angle of thread (i. e. the angle included between the sides of the thread measured in an axial plane) and pitch or lead. A variation in any one of these elements of a screw thread from a fixed standard for any size will prevent a perfect fit.

Heretofore the suitability of threaded parts for interchangeability within a given class of fit has been tested by the use of various forms of gauges termed "go" and "not go". If the threaded member will be acceptable by the "go" gauge and unacceptable by the "not go" gauge it has been passed as sufficiently accurate. This condition, however, does not necessarily signify that each of the various elements, for which there are tolerance limits is actually within such limits, since variation in one may, to a greater or less extent, offset variation in another. For example, an excessively long or short lead in a screw will give an effect of increased pitch diameter in the closeness of engagement of the screw in a standard nut and in some types of "go" gauge.

Another deficiency of the "go" and "not go" gauges is the fact that if the threaded work is accepted by the "go" gauge and refused by the "not go" gauge there is nothing to indicate how near the work is to being refused by the "go" gauge and accepted by the "not go" gauge; that is, how near its dimensions are to the standard. It is desirable, however, to determine a position between the upper and lower tolerance limits which permits the widest departures therefrom without causing rejection of the work and which, when the thread forming machine is once adjusted to it, will permit the machine to run longest without overrunning the boundaries of tolerance.

According to the present invention, therefore, gauging means are provided by which the nearness to this desirable position within the tolerance range of certain important elements or dimensions may be determined in an expeditious manner, and at the machine by which the threads are being formed, so that the machine operator may be guided as to proper adjustments of the machine to be made from time to time tending to correct the departures in either direction of such elements, or dimensions, from such mid-tolerance positions so that such departures may be maintained at all times within the tolerance limits. More specifically, gauges by which departures from pitch diameters and lead from those of standard threads may be indicated will be hereinafter disclosed and claimed.

Snap and ring gauges for outside work and plug gauges for inside work, as heretofore constructed, have been subject to abrasion and wear which makes it necessary to establish tolerance boundaries for such gauges. The gauges of the present invention are opening and closing gauges designed to compare taps, screws and other threaded parts directly with the standard plug gauge, eliminating the need of the usual intermediate gauges and loss of size of gauges having more or less fixed adjustments due to wear of use. The fact that these gauges are open and closing gauges prevents wear thereon when the work is inserted or removed and they may be compared frequently with an inspector's gauge or even the standard gauge, if desired, without appreciable wear on those gauges. The plug gauge is the only member of the screw family which can be made with great accuracy and it alone is thus suitable for use as the foundation of all thread measurements including both external and internal threads. The gauges of the present invention, also, close with stress on the threads to be tested thus tending to even out surface inequalities and throughout practically the entire thread circumference and they equalize inequalities in substantially the same manner as when the thread is in service.

In general, each of these gauges comprises a plurality of threaded members engageable with standard threads with a relatively loose fit, and so carried or mounted that their threads are capable of measured relative motions into pressing engagement with the threads of the standard threaded member and of those members to be tested, variations in the extent of such motions, when applied to standard threads and to those to be tested, indicating in amount and direction variations of the threads to be tested from the standard threads.

Relative movement of the threads of the gauge members to bring a side face of each thread into contact with opposite side faces of the standard thread, gives by the extent of said relative movement, an indication of the flank thickness of the standard thread, and variations in the extent of such movement required to bring the side faces of the threads of these members into contact with the opposite side faces of the threads to be tested indicate variations in flank thickness of the threads to be tested from those of the standard thread. Flank thickness, i. e., the thickness of a thread from flank to flank measured at the standard pitch line, is a true measure of the strength of the thread and heretofore has been arrived at indirectly by measurement of pitch diameter which is a definite function only of flank thickness, depending on the angle of the thread faces. With the usual angle of 60°, variations of pitch diameter cause .577 of those amounts in corresponding variations of flank thickness at the pitch line.

As measurement of pitch diameter as heretofore practiced is made at single points only it may give a local measurement only which may not truly indicate the strength of the thread in service where the bearing of the mating thread thereon is over an extended area. Such measurements are reliable only when made on especially prepared smooth threads and are not suitable for testing the relatively rough surfaced threads produced by the usual thread forming machines. The contact between the threads of the gauge members of the present invention and the threads to be tested is similar to that which the threads to be tested have with their mating threads in service, except that it does not extend so far toward the thread roots due to the slight difference in size of the threads of the gauge members from that of the work with which the threads to be tested are intended to engage.

If the lead of the screw to be tested is correct, the angle through which one gauge member can be turned relatively to the other will be the same in both directions, and the difference between such angles and the angles of rotation permitted by a master plug with an accurate standard thread, when inserted in the gauge, will represent the variation of the flank thickness or pitch diameter of the screw from standard. If, however, the lead of the screw to be tested is incorrect, then the angles of relative rotation of the gauge members in opposite directions will be different. The two gauge members are preferably made of such a thickness that their combined length of thread is approximately equal to the length of thread which is normally engaged by a nut when a screw or bolt of the kind tested is in actual use. Since a lead error which would be serious in the case of a nut having for example an axial length of an inch, might be unobjectionable for a nut with an axial length of say ¼ inch, it is desirable to apply the test for the presence of lead error over a length of the screw approximately equal to that of the nut to be used therewith.

In constructing a gauge embodying the present invention, which is to operate on the principles hereinbefore discussed, various means may be employed to maintain the two parts of the gauge with the axes of their threaded apertures in correct alinement, to prevent relative axial movement of the members, to permit relative rotation thereof, and to indicate the angles of rotation in either direction from an "open" position in which the threads of the members lie in a common helix. These angles of rotation may be directly calibrated in terms of error in flank thickness. This invention relates more particularly to certain gauges of the type hereinbefore mentioned. For a more complete disclosure of these gauges, reference is had to the description thereof which follows, and to the drawings, of which,—

Figures 1, 2, 3, 4:
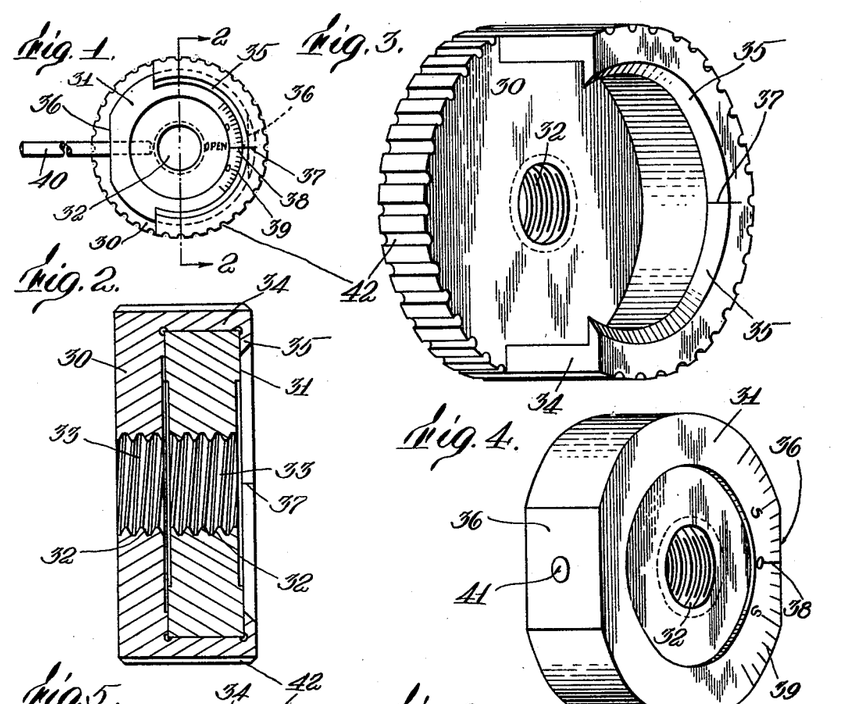
Figure 1 is an elevation of a thread gauge embodying my invention.
Figure 2 is a section on the line 2—2 of Figure 1.
Figures 3 and 4 are perspective views of the two threaded members of the gauge.
Figure 5:
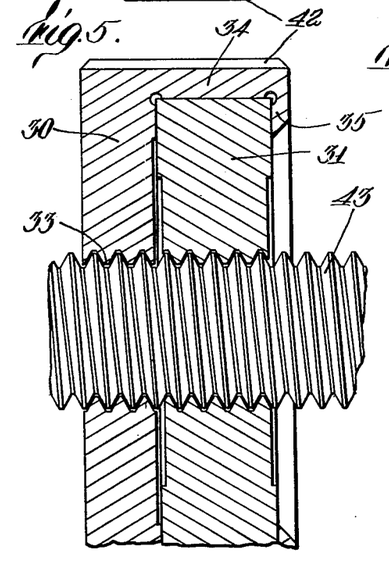
Figure 5 is a fragmentary section of the gauge in its "open" position, a screw being shown in place in the gauge.
Figure 6:
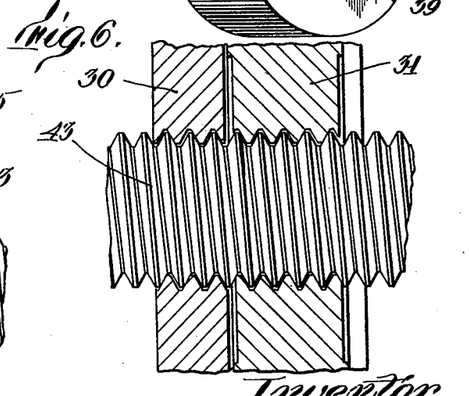
Figure 6 is a fragmentary view similar to Figure 5 but showing the members engaging the flanks of the screw.

Referring to the drawings in detail, Figures 1 to 6 illustrate a simple embodiment of the invention, comprising essentially two cooperating disk-like members 30, 31, each having an axial aperture or perforation 32 which is threaded as at 33 to receive a screw or other threaded element to be tested. The thread 33 is preferably formed with a pitch diameter sufficiently large to receive the maximum tolerable screw to be tested with an easy fit, that is, to permit the ready introduction of such a screw into the gauge by turning the screw with the fingers. The members 30 and 31 are held in coaxial face-to-face engagement when the gauge is in use. To this end, a flange 34 extends in an axial direction from a portion of the periphery of the member 30, this flange having an inturned lip 35. The flange extends somewhat more than half the periphery of the member 30 and forms a cylindrical recess or socket on one side of the member 30 which is open through a portion of the periphery. The member 31 is constructed to fit closely but slidably in this recess formed by the flange 34 and is of sufficient thickness to fit snugly between a face of the member 30 and the inner surface of the lip 35. It is thus restrained at all times from axial movement relative to the member 30. In order to permit the insertion of the member 31 into the recess formed by the flange 34, and its removal therefrom, the member 31 may be provided with a pair of flats 36 diametrically opposed on its periphery, these flats reducing the diameter therethrough by a sufficient amount to permit the member 31 to slip between the ends of the flange 34 when the member 31 is turned at right angles to its position as shown in Figure 1. After the member 31 has been inserted in the recess, it may be rotated there-into the position shown in Figure 1, in which position it is held in place by the flange 34 and lip 35. The thread 33 in the two members 30, 31 is preferably formed so as to lie in a common helix when the member 31 is in the angular position relative to the member 30 which is shown in Figure 1. This may be called its "open" position. In order to indicate the open position of the gauge, a suitable index mark 37 may be placed on the lip 35, this mark cooperating with an "open" mark 38 on the outer face of the member 31. In addition to the "open" mark, there may be placed on the face of the member 31 or on the lip 35, a series of scale marks 39 extending in both directions from the mark 38 or 37. These scale marks in conjunction with the index 37 are employed to indicate the amount of relative rotation of the gauge members permitted between the open position and the jamming positions in which the relative rotation in either direction is stopped by engagement of the threads of the gauge members with opposite flanks of the screw thread. The scale 39 may be calibrated to indicate flank thickness in terms of pitch diameter for a screw of correct lead, or deviations of flank thickness from standard. In calibrating for deviations from standard, a threaded plug having an accurate standard thread may be inserted in the gauge and the gauge members rotated as far as they will go in each direction. The scale marks indicating the limiting angles may be marked as with a zero. The other scale marks thus may indicate the amount by which any screw deviates from the standard. If desired, tolerance limits may be marked with reference to these standard angles. Opposite the mark 38 on the member 31 a suitable handle 40 may be attached to the member 31 or set into a hole 41 in the periphery thereof in such a way as to prevent the member 31 from being rotated in the socket through a sufficient angle to permit its removal therefrom. The periphery or rim of the member 30 is preferably roughened, knurled, or grooved, as at 42 to provide a firm grip on the member for the fingers of the operator. In using the gauge, the member 31 is adjusted with relation to the member 30 as shown in Figure 1, so that the open line 38 is opposite the index line 37. In this position, the gauge is open and the threads 33 of the two members lie in a common helix. A screw or other threaded element 43 to be tested may be inserted in the gauge. The member 31 is rotated as far as possible in one direction, then in the other, by manipulation of the handle 40, and its limiting angular positions in each direction noted. If the screw has a correct lead but has a flank thickness which is less than normal at the standard pitch line, the member 31 will be permitted to rotate through a larger angle in each direction than the standard angles before reaching its limiting positions. On the other hand, if the flank thickness of the thread of the element to be tested is thicker than normal at the standard pitch line, then a smaller than normal angle of rotation in either direction will be permitted. In either case, however, the angles of rotation in opposite directions from the open position will be equal to each other. The interfacial pressure between the flanks of the thread 33 and the thread of the element being gauged may be considerable due to the mechanical advantage in the device. This simulates to some extent the working conditions which the threaded element will encounter in actual use and serves to press down or remove any small surface inequalities on the flanks of the thread which would tend to give a false indication with more delicate apparatus.

If the threaded element to be gauged has a lead error, it is obvious that the permitted angle of rotation of the member 31 from the open position will be different in the opposite directions, since the advancing thread of the member 31 will overtake and engage the thread of the screw to be tested more quickly in one direction than in the other. Hence if the angles of rotation of the member 31 are unequal, an error in lead is present. If the thread being tested is, however, of reasonably regular and symmetrical profile, the flank thickness can be obtained by rotating the member 31 in both directions from the open position and noting the larger of the two angles of rotation. That this will give a very close approximation to the flank thickness of a screw having a regular profile, may be seen from a consideration of Figure 5. Suppose that the screw 43 has a lead error. Then the clearance between its thread turns and those of the members 30, 31 will be least at the turns next to the mutually remote faces of the members 30, 31 and greatest about half way between these faces. Hence if the member 31 is rotated to the left on a screw having long lead error, the outer thread turns of the members will quickly engage the thread of the screw 43. Rotation of the member 31 to the right, however, results in the engagement of mutually adjacent thread turns of the members 30, 31 with the screw 43, a greater angle of rotation being permitted by the greater clearance to be taken up at that point. Since an ordinary lead error which is small enough to permit the entry of the screw into the gauge is negligible for a distance of one of two thread turns, the angle of rotation to the right will be practically unaffected by the presence of long lead error and is consequently a measure of the flank thickness of the thread to be tested. In like manner, if the screw 43 has a short lead error, rotation of the member 31 to the right quickly results in engagement of the mutually remote thread turns of the members 30, 31 with the screw 43, whereas rotation of the member 31 to the left, resulting in apparent axial motion of the threads of the members toward each other results in engagement of mutually adjacent thread turns of the members with the screw after taking up the maximum clearance which permits the greater angle of rotation of the member 31. Hence as the points of engagement of the members 30, 31 with the screw are axially spaced by a distance of only one or two thread turns, the indication of the flank thickness is practically unaffected by the presence of lead error.

Figures 7, 8, 9, 10:
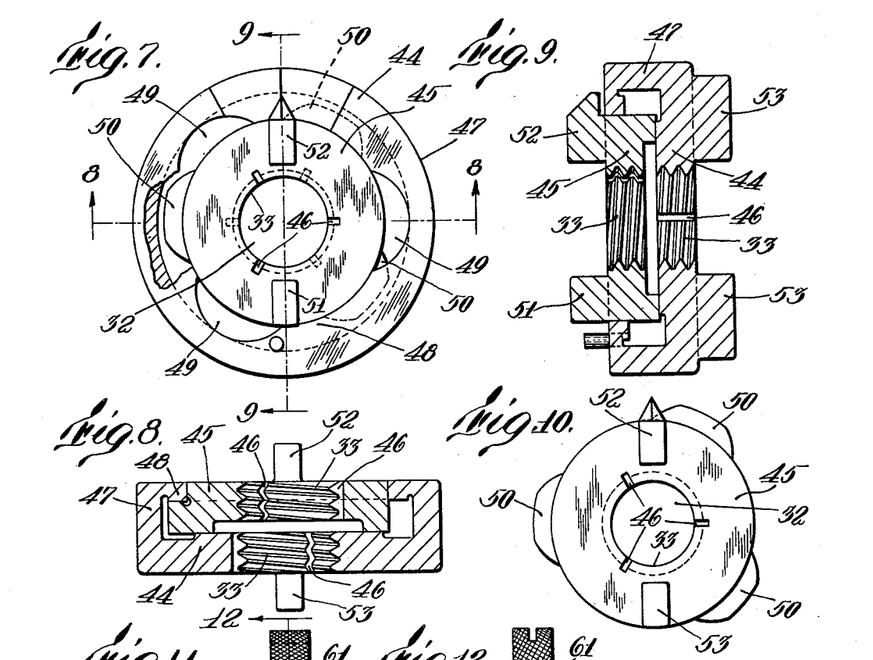
Figure 7 is an elevation of a modified form of the invention.
Figure 8 is a section on the line 8—8 of Figure 7.
Figure 9 is a section on the line 9—9 of Figure 7.
Figure 10 is an elevation of one of the members of the gauge shown in Figure 7.

The modified forms of the device which are illustrated in the drawings all operate on the same principle, but differ from each other in specific means for holding the two gauge members in coaxial face-to-face engagement. Figures 7 to 10 illustrate a gauge having two principal members 44, 45 these members being generally of disk-like form with axial apertures threaded as at 33. In this form of gauge, the member 44 is provided with a cylindrical flange 47 extending from the entire periphery of the member and provided with an inturned lip 48. This lip is radially recessed as at 49 in one or more places. In the embodiment shown in Figure 7, there are three such recesses. The member 45, which is adapted to rotate in the socket formed by the flange 47 in the lip 48, consists of a cylindrical body portion from which extend a number of lugs 50 equal in number to the recesses 49 in the lip 48. The lugs 50 are preferably arranged on the periphery of the member 45 so that the arcs between them are of different sizes. As a result, the member 45 may be inserted into or removed from the socket in the member 44 only when it is in a single predetermined angular position with reference to the member 44. Such position for insertion or removal is preferably about 180° from its open position, as illustrated in Figure 7. This construction provides areas of contact between the lugs 50 and the inner face of the lip 48 at points distributed around the periphery of the member 45 for all operative positions of the member 45 with respect to the member 44, thus effectively holding the member 45 in face-to-face engagement with the member 44. The member 45 may be provided with a pair of lugs 51 and 52, one of these lugs serving as an index to cooperate with scale divisions or tolerance marks on the lip 48. These lugs project outwardly from the outer face of the member 45 and may be conveniently pressed with fingers of the operator to rotate the member 45 in one direction or the other. Suitable lugs 53 may be provided on the opposite outer face of the member 44 for convenience in manipulating the gauge. In order to permit the escape of dust or other foreign matter which may be caught between the flanks of the threads 33 and those of a threaded element inserted in the gauge, suitable slots 46 may be provided extending transversely of the thread 33. The side edges of the slots 46 tend to scrape along the flanks of the thread of a screw inserted in the gauge and thus to clean the flanks. The operation of the gauge is precisely the same as that of the gauge shown in Figure 1 as hereinbefore described.

Figures 11, 12:
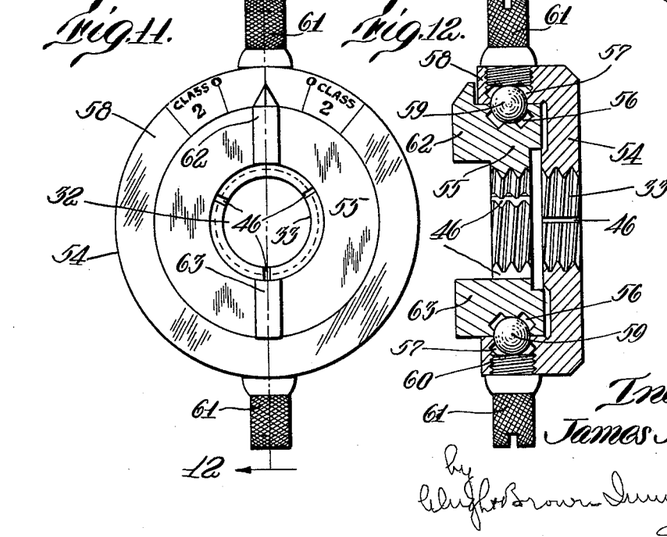
Figure 11 is another modified form of the invention.
Figure 12 is a section on the line 12—12 of Figure 11.

Figures 11 and 12 illustrate another modified form of gauge comprising a flange member 54 having a socket in one side thereof to receive a member 55. The member 55 is grooved peripherally as at 56 and a corresponding groove 57 is formed in the inner wall of the flange 58 which extends around the periphery of the member 54. The grooves 56 and 57 register when the member 55 is in face-to-face engagement with the member 54 and together provide a race for a series of ball bearings 59 which project into both grooves and thus hold the members 54, 55 in face-to-face engagement. One or more openings 60 may be provided extending radially through the wall of the flange 58, through which the balls 59 may be introduced into the race. The openings 60 may be plugged in any suitable manner as by screws 61, the outer portions of which may be knurled and which may serve as handles in the manipulation of the gauge. A pair of lugs 62, 63 may be arranged to project from the outer face of the member 55, the lug 62 being preferably pointed or marked to serve as an index cooperating with marks on the face of the flange 58 indicating the amounts of angular adjustment from the open position and the limits of tolerance.

Figure 13:
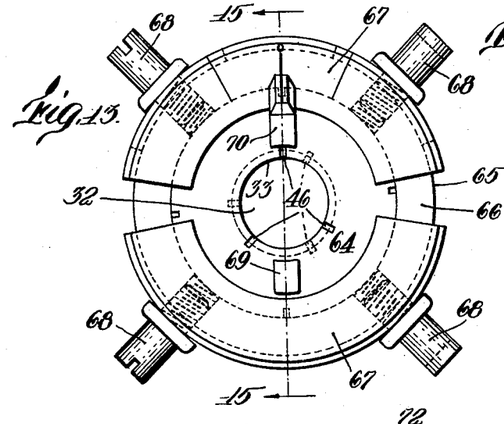
Figures 13 and 14 are further modified forms of the invention.
Figure 15:
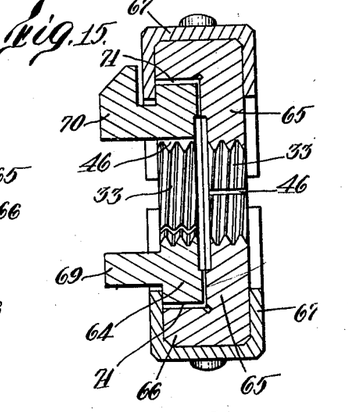
Figure 15 is a section on the line 15—15 of Figure 13.

The embodiment of the invention illustrated in Figures 13 and 15 comprises a pair of disk-like members 64, 65, the former being fitted into a socket in a side of the latter and formed by a flange 66 on the member 65 which extends all around the periphery of the member 64. In order to hold the two members in face-to-face engagement, two or more arcuate channel pieces 67 may be provided, these being shaped to fit over the periphery of the member 65 and its flange 66, and to extend inwardly to engage a portion of the outer face of the member 64. A suitable number of set screws 68 may be provided to secure the channel pieces 67 in place, the set screws preferably having upstanding heads to aid in the manipulation of the gauge. On the outer face of the member 64, a pair of lugs 69, 70 may be provided, one of these lugs serving as an index to cooperate with marks and tolerance boundaries on one of the channel pieces 67. Transverse slots or channels 71 may be formed in the peripheral and inner faces of the member 64 to collect dust or the like which may work in between the mutually engaging surfaces of the members 64 and 65. Similar channels may, if desired, be provided in any of the other embodiments illustrated, whether or not they happen to be shown on the drawings.

Figures 14, 16:
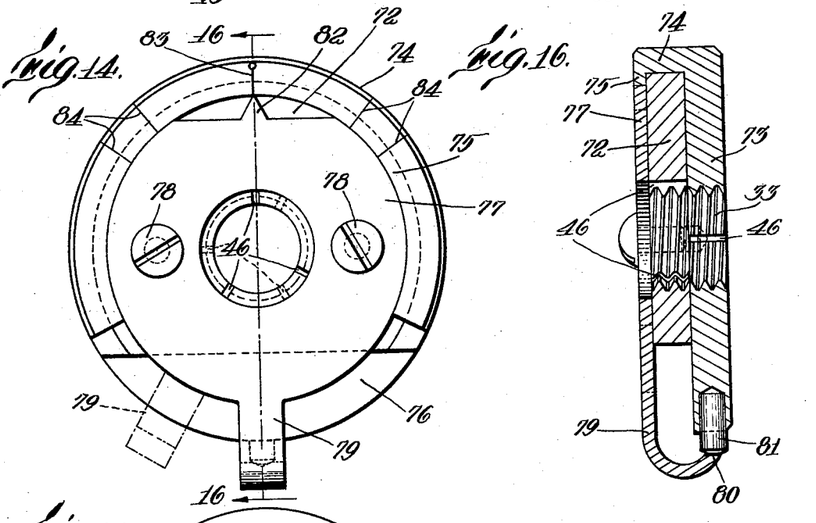
Figure 16 is a section on the line 16—16 of Figure 14.
Figure 17:
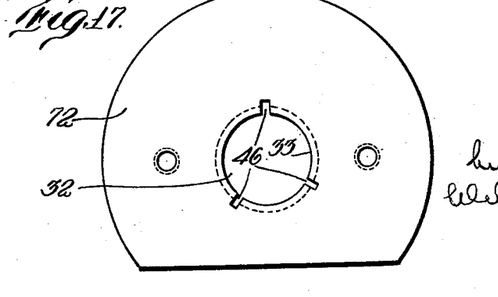
Figure 17 is an elevation of one of the members of the gauge illustrated in Figure 14.
Figures 18, 19:
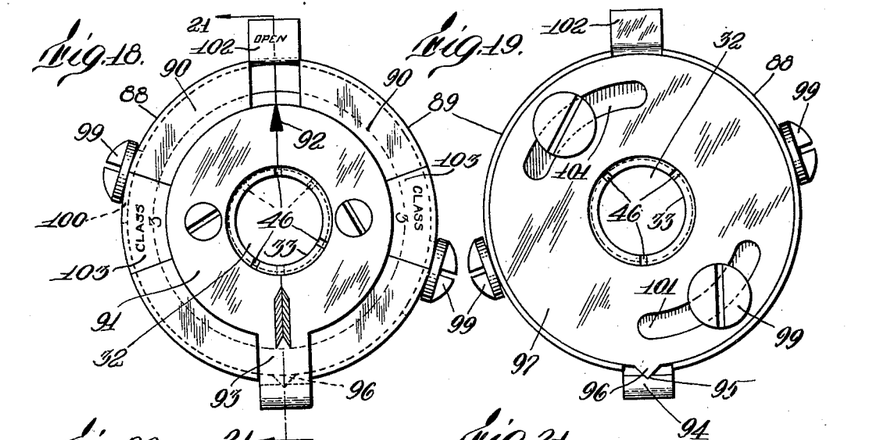
Figure 18 is another modified form of the invention shown in elevation.
Figure 19 is a rear view of the gauge shown in Figure 18.
Figure 20:
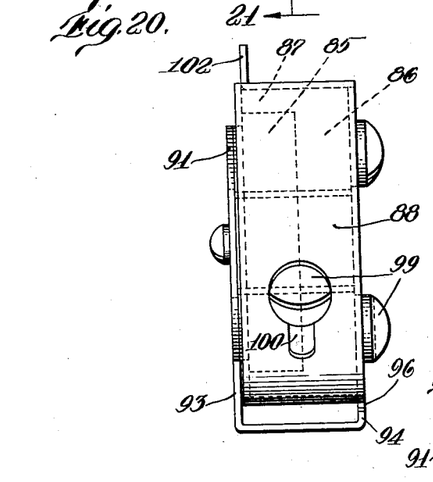
Figure 20 is an edgewise view of the same.
Figures 21, 22:
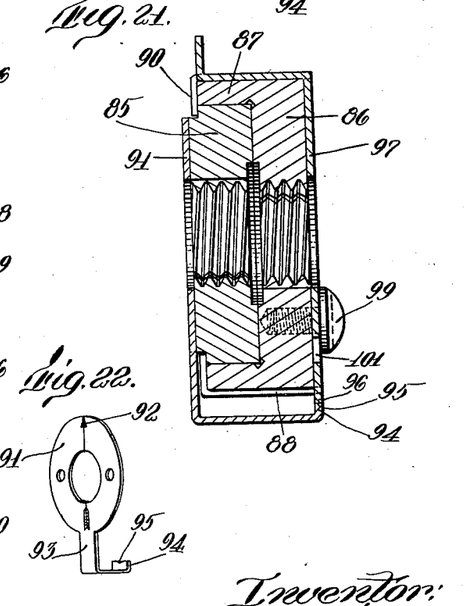
Figure 21 is a section on the line 21—21 of Figure 18.
Figure 22 is a perspective view of the front plate of the gauge shown in Figure 18.
Figure 23:
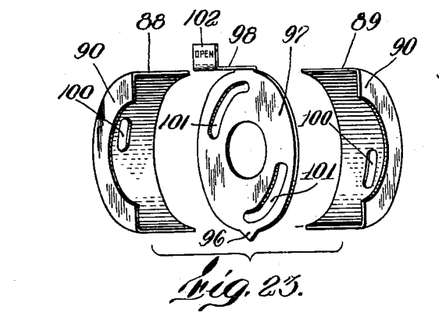
Figure 23 shows in perspective the rear and side cover plates of the same.

Figures 14, 16 and 17 illustrate another embodiment of the invention comprising two members 72, 73, one of which is rotatable in the other. As shown in Figure 17, the member 72 comprises a disk having a peripheral flat which enables it to be inserted into or withdrawn from a socket on a side of the member 73 formed by a peripheral flange 74 having an inturned lip 75, the flange and lip being cut away as at 76 for a considerable portion of the periphery, but less than half thereof, to admit the member 72. It is obvious that in order to insert or withdraw the member 72, it must be turned to a position approximately at right angles to that shown in Figure 14. After its insertion in the socket, it is turned to the position shown in Figure 14 which is preferably its open position. In order to prevent accidental separation of the parts, and to facilitate the handling of the gauge, a plate 77 may be secured to the outer face of the member 72 as by a pair of set screws 78. The plate 77 may be made to fit within the edge of the lip 75 and is provided with an extension 79 which serves both as a handle for the rotation of the member 72 and also as a limit stop to limit the angular adjustment of the member 72. As shown in Figure 16, the extension 79 may be bent around as at 80 to spring over a projecting end of a pin 81 and to catch lightly thereon, a shallow notch being formed in the end 80 of the projection 79. This holds the gauge in its open position while a threaded element is being introduced thereinto to be gauged. The plate 77 may be also provided with an index 82 which cooperates with a suitable mark 83 and scale divisions or tolerance boundaries 84 on the lip 75.

A further embodiment of the invention is illustrated in Figures 18 to 23 inclusive. In this form, a member 85 fits rotatably in a socket formed in a side of a member 86 by a peripheral flange 87 which extends all around the periphery of the member 85. The latter is held in face-to-face engagement with the member 86 by a pair of arcuate side plates 88, 89 which are secured to the peripheral face of the member 86 and flange 87, and are provided with an inturned lip 90 which extends over and engages a portion of the outer face of the member 85. A plate 91 may be secured to the outer face of the member 85, this plate being provided with an index 92 and an extension 93 which projects beyond the periphery of the gauge and serves as a handle to turn the member 85. The projection 93 may be bent to extend across the periphery of the member 86 so that its inturned end 94, which is preferably notched as at 95, engages on a suitable projection 96 formed on a rear plate 97 which is secured to the outer face of the member 86 and releasably holds the gauge in its "open" position. The rear plate 97 may be provided with an extension 98 projecting across the periphery of the member 86. The arcuate casing members 88, 89 do not completely surround the periphery of the member 86 and flange 87, but their upper end edges may abut against the adjacent edges of the projection 98. The side casings and back plate may be secured to the member 86 as by set screws 99 which extend through elongated slots 100 in the side plates and arcuate slots 101 in the rear plate. The extension 98 may terminate in an upstanding tab 102 on which a mark may be made cooperating with the index 92 to indicate the open position of the gauge. Tolerance areas 103 or suitable scale divisions may be marked on the lips 90 of the casings 88 and 89 to cooperate with the index 92. The slots 100 and 101 permit the angular adjustment of the rear plate and casings. Angular adjustment of the rear plate 97 determines the position of its projection 96 and, when the notch is engaged with the projection 96, the angular relation of the two members 85, 86. The members may thus be adjusted to their correct open position after their threads have been cut, which is simpler and easier than cutting the threads in a common helix for a predetermined relative position of the members. The slots 100 permit the individual adjustments of the side plates 90 on the periphery of the flange 87 so that the tolerance areas marked thereon may be adjusted with relation to the index 92. This permits not only initial adjustment of the tolerance areas to the positions desired, but also permits corrective adjustments to offset the effects of wear on the threads of the gauge members.

The operation of all of the various embodiments described herein is precisely the same as that described in detail with reference to the form illustrated in Figure 1.

Having thus described certain embodiments of this invention, it should be evident to those skilled in the art that various changes and modifications might be made therein without departing from its spirit or scope as defined by the appended claims.

I claim:—

1. A method of gauging a screw, which comprises screwing onto said screw two ring gauges which are relatively adjustable about their common axis and are thus so adjusted that their threads lie in a common helix, the threads being of a sufficient pitch diameter to receive the maximum tolerable screw to be gauged, effecting a relative rotation of the gauges from their original adjusted position as far as possible while restraining them from relative axial movement to cause their threads to jam against the opposite flanks of the threads of the screw, and noting the angle of relative rotation of said ring gauges.

2. A method of gauging a screw, which comprises screwing onto said screw two ring gauges which are relatively adjustable about their common axis and are thus so adjusted that their threads lie in a common helix, the threads being of a sufficient pitch diameter to receive the maximum tolerable screw to be gauged, rotating one gauge relatively to the other from their original adjusted position through the maximum permitted angle in both directions while restraining the two gauges from relative axial movement, and noting the amount of rotation permitted in each direction from the original adjusted position of the gauges.

3. A method of gauging a screw, which comprises screwing onto said screw a pair of ring gauges which are relatively adjustable about their common axis and are thus so adjusted that their threads lie in a common helix, the threads being of a sufficient pitch diameter to receive the maximum tolerable screw to be gauged, rotating one gauge relatively to the other from their original adjusted position through the maximum permitted angle in both directions while restraining the gauges from relative axial movement, noting the amount of rotation permitted in each direction from the original adjusted position of the gauges, substituting a standard threaded plug for the screw, noting the permitted amounts of relative rotation of the gauges when screwed on said plug, and comparing the relative rotation permitted in each direction by the screw to be gauged with the rotation permitted by said plug.

4. A gauge comprising a pair of members, each having a threaded aperture, said members being relatively adjustable about their common axis to positions wherein their threads lie in a common helix and being normally so adjusted, means for preventing relative axial movement of said members but permitting their relative rotation; and means for indicating the amount of relative rotation in either direction from said normal adjusted position.

5. A gauge comprising a pair of members in face-to-face engagement, each having a threaded aperture therethrough, said members being relatively adjustable about their common axis to positions wherein their threads lie in a common helix and being normally so adjusted, means for maintaining said members in mutual engagement but permitting relative rotation thereof, and means for indicating the amount of relative rotation of said members in either direction from said normal adjusted position.

6. A gauge comprising a pair of members, each having a threaded aperture therethrough, one of said members having a disk-like form with a flange extending forwardly from more than half of the periphery of a face thereof, the other member having a disk-like form fitting closely but rotatably within said flange and in face-to-face engagement with said flanged member, and means associated with said flange for maintaining said face-to-face engagement, both of said apertures being coaxial with the axis of rotation of one said members on the other.

7. A gauge comprising a pair of disk-like members having alined threaded apertures therethrough, means for maintaining said members in face-to-face engagement and said apertures in line while permitting relative rotation of one member with respect to the other, the threads in said apertures being formed to lie in a common helix when the members are in a certain intermediate position of angular adjustment, an index on one of said members, and scale marks on the other member cooperating with said index to indicate angles of relative rotation of the members in either direction from said intermediate position of adjustment.

8. A gauge comprising a pair of disk-like members in face-to-face engagement, each said member having an axial aperture therethrough, said apertures being threaded so that their threads lie in a common helix when the disks are in a certain intermediate position of relative angular adjustment, one of said members having a circular recess in a side thereof concentric with the axis of its aperture, the other said member being fitted into said recess and in face-to-face engagement with the recessed member, means for retaining said other member in said recess in engagement with said recessed member, said retaining means comprising a lip associated with the recessed member and engaging the outer face of said other member, and means for indicating the amount of relative rotation of said members in either direction from said intermediate position of angular adjustment.

9. A gauge comprising a pair of disk-shaped members in face-to-face engagement, each said member having an axial aperture therethrough, said apertures being alined and threaded so that their threads lie in a common helix when the disks are in a certain intermediate position of relative angular adjustment, and means for maintaining the two members in alined face-to-face engagement but permitting relative rotation, said means comprising an arcuate extension from the peripheral portion of one of said members forming a recess to receive the other said member and being of such peripheral length as to engage only somewhat more than half the edge of said other member, said extension having an inturned lip engaging a corresponding portion of the outer face of said other member, said other member being shaped to enter said recess when in a relative angular position beyond the normal operative range of angular rotation from said intermediate position of adjustment.

10. A gauge comprising two disk-like members in coaxial face-to-face engagement, said members having coaxial threaded apertures therethrough with threads lying in a common helix when the members are in a certain intermediate position of relative angular adjustment, one of said members having a circular recess in one side thereof to receive the other member, said recess being partially surrounded by an arcuate flange having an inturned lip, said flange and lip engaging only somewhat more than half the periphery and a corresponding portion of the outer face of said other member, said other member having a flat in its peripheral edge permitting it to enter and leave said recess edgewise when in a certain angular position relative to the recessed member, and means secured to said other member for preventing rotation of said member to the angular position in which it can be removed from the recessed member.

11. A gauge comprising a pair of members, each having a threaded aperture, said members having a combined axial length substantially equal to that of a standard nut of corresponding pitch diameter and being adjustable about their common axis to an intermediate relative position wherein their threads lie in a common helix, means for preventing relative axial movement of said members but permitting their relative rotation, and means for indicating the amount of relative rotation in either direction from said intermediate adjusted position.

12. A gauge comprising a pair of gauge members having no threaded engagement with each other, said members each being threaded for loosely fitted engagement with the thread to be tested and relatively rotatably adjustable about their common axis to positions wherein their threads lie in a common helix and being normally so adjusted, said gauge including portions acting as stops against axial movement of each of said members in both directions relative to the other, and means for indicating the amount of relative rotation in both directions from said normal adjusted position.

13. A gauge comprising a pair of rings threaded for loosely fitted engagement with the thread of a screw to be tested, said rings being relatively adjustable about their common axis to positions wherein their threads lie in a common helix and being normally so adjusted, one of said rings having on a portion of its periphery an inturned flange overlapping a portion of the face of the other said ring and thereby acting as a stop against axial movement of said other ring in a direction away from the first said ring, and means for indicating the amount of relative rotation in both directions from said normally adjusted position.

In testimony whereof I have affixed my signature.

JAMES HARTNESS.